US008132309B1

(12) United States Patent
Bronson

(10) Patent No.: US 8,132,309 B1
(45) Date of Patent: Mar. 13, 2012

(54) APPARATUS FOR JOINING BOARDS

(75) Inventor: John M. Bronson, St. Louis, MO (US)

(73) Assignee: John M. Bronson

( * ) Notice: Subject to any disclaimer, the term of this patent is extended or adjusted under 35 U.S.C. 154(b) by 0 days.

(21) Appl. No.: 13/118,261

(22) Filed: May 27, 2011

(51) Int. Cl.
*B60C 25/18* (2006.01)

(52) U.S. Cl. ................ 29/275; 29/271; 29/281.1; 269/6

(58) Field of Classification Search ............ 29/244–255, 29/270–278, 281.5, 281.6; 269/3, 6, 95, 269/257, 268, 271; 144/286.1, 286.5, 253.6; 83/447, 475, 446, 13
See application file for complete search history.

(56) References Cited

U.S. PATENT DOCUMENTS

| | | | | |
|---|---|---|---|---|
| 4,373,980 | A * | 2/1983 | Skalmierski et al. | 156/160 |
| 4,476,757 | A | 10/1984 | Morris | 83/446 |
| 4,752,063 | A * | 6/1988 | Nagy | 269/266 |
| 5,000,320 | A | 3/1991 | Kuchenbecker | 144/251 |
| 5,274,902 | A | 1/1994 | Rowley | 29/525 |
| 5,513,838 | A * | 5/1996 | Van Rossum | 269/203 |
| 6,298,896 | B1 * | 10/2001 | Sherrill et al. | 156/581 |
| 6,718,857 | B2 | 4/2004 | Kimmel et al. | 83/447 |
| 6,968,766 | B2 | 11/2005 | Kimmel et al. | 83/447 |
| 7,017,464 | B2 | 3/2006 | Coderre | 83/446 |
| 7,140,286 | B2 | 11/2006 | Schwartz | 83/446 |
| 7,290,761 | B2 * | 11/2007 | Siegel | 269/266 |
| 7,299,840 | B1 | 11/2007 | Moschetti | 144/253 |
| 7,628,562 | B2 | 12/2009 | Annes | 403/329 |
| 7,735,237 | B1 | 6/2010 | Moon | 33/783 |
| 7,942,174 | B2 * | 5/2011 | Kozina et al. | 144/253.6 |
| 2003/0140754 | A1 | 7/2003 | Kimmel et al. | 83/447 |
| 2004/0250902 | A1 | 12/2004 | Kimmel et al. | 144/286 |
| 2010/0307302 | A1 | 12/2010 | Smith | 83/13 |

FOREIGN PATENT DOCUMENTS

| | | |
|---|---|---|
| WO | WO9200172 A1 | 1/1992 |
| WO | WO 2010/020006 | 2/2010 |

* cited by examiner

*Primary Examiner* — Lee D Wilson

(57) ABSTRACT

A clamping apparatus is provided that includes a first clamp component having a center portion, and a first set of flexible fingers and second set of flexible fingers disposed on opposing sides of the center portion. The first and second sets of flexible fingers extend angularly in a direction towards the center portion such that the first set of flexible fingers extend in a generally opposing directions from the second set of flexible fingers. The clamping apparatus includes a second clamp component having a center portion, and a first set of flexible fingers and second set of flexible fingers disposed on opposing sides of the center portion. The first and second sets of flexible fingers extend angularly in a direction towards the center portion such that the first set of flexible fingers extend in a generally opposing direction from that of the second set of flexible fingers.

19 Claims, 4 Drawing Sheets

APPARATUS FOR JOINING BOARDS

FIELD OF INVENTION

The present disclosure relates to clamping devices, and more particularly to a clamping apparatus for joining the ends of two boards of variable length having mating joints on their adjoining ends.

BACKGROUND

This section provides background information related to the present disclosure which is not necessarily prior art.

In constructing furniture or similar items, woodworkers and craftsman expend substantial effort in fabricating joints (e.g., finger joints, box joints, etc.) that are not only precise and sturdy, but also are aesthetically pleasing. For example, the use of finger joints to fit parts of furniture together is an admirable and old woodworker art which is generally pleasing to the eye. A finger joint has two opposed mating ends, which fit together in a complimentary fashion to form the attractive looking, strong joint. With the mating finger joints along an end of two boards, the boards may be placed end-to-end and joined to fabricate an integral board of an unlimited length. For companies that construct furniture that typically require longer or larger boards with joints, craftsmen resort to using automated production grade fixtures to maintain the correct positional relationship when joining two boards and reduce the amount of time required to produce such joints. Such commercial fixtures are complicated to set up, cumbersome to store, move around or reposition, and expensive. The home craftsman has limited ability to purchase such joining fixtures.

SUMMARY

This section provides a general summary of the disclosure, and is not a comprehensive disclosure of its full scope or all of its features. The present disclosure relates to a clamping device for joining two boards of varying lengths. According to one aspect of the present disclosure, a clamping apparatus is provided that includes a first clamp component having a center portion, and a first set of flexible fingers and second set of flexible fingers disposed on opposing sides of the center portion. The first and second sets of flexible fingers extend angularly in a direction towards the center portion such that the first second set of flexible fingers extend in a generally opposing direction from that of the second set of flexible fingers. The clamping apparatus further includes a second clamp component having a center portion, and a first set of flexible fingers and second set of flexible fingers disposed on opposing sides of the center portion. The first and second sets of flexible fingers extend angularly in a direction towards the center portion such that the first second set of flexible fingers extend in a generally opposing direction from that of the second set of flexible fingers. The first and second sets of flexible fingers on the first and second clamp components are configured to deflect when forced against two unjoined boards disposed between the flexible fingers of the first and second clamp components, so as to cause the two unjoined boards to move towards each other to join the mating ends of the boards.

In another aspect of the present disclosure, a method is provided for joining the ends of two boards of variable length having mating joints on their adjoining ends. In one embodiment, the method comprises positioning two boards of varying length having mating joints on their adjoining ends so that the mating joints on adjoining ends are facing each other. The method further comprises positioning on a first side of the two boards a first clamp component having a center portion and first and second sets of flexible fingers extending in opposing directions, and positioning on a second side of the two boards a second clamp component having a center portion and first and second sets of flexible fingers extending in opposing directions. The method includes applying a clamping force across the first and second clamp components to compress the first and second sets of flexible fingers on the first and second clamp components against the two boards. The compression causes deflection of the flexible fingers, which causes a first board disposed between the first and second clamp components to be displaced at least 0.125 inches towards the center portions of the clamp components, and which causes a second board disposed between the first and second clamp components to be displaced at least 0.125 inches towards the center portions of the clamp components. The method results in the mating joints on the ends of the first and second boards being displaced towards and compressed against each other Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
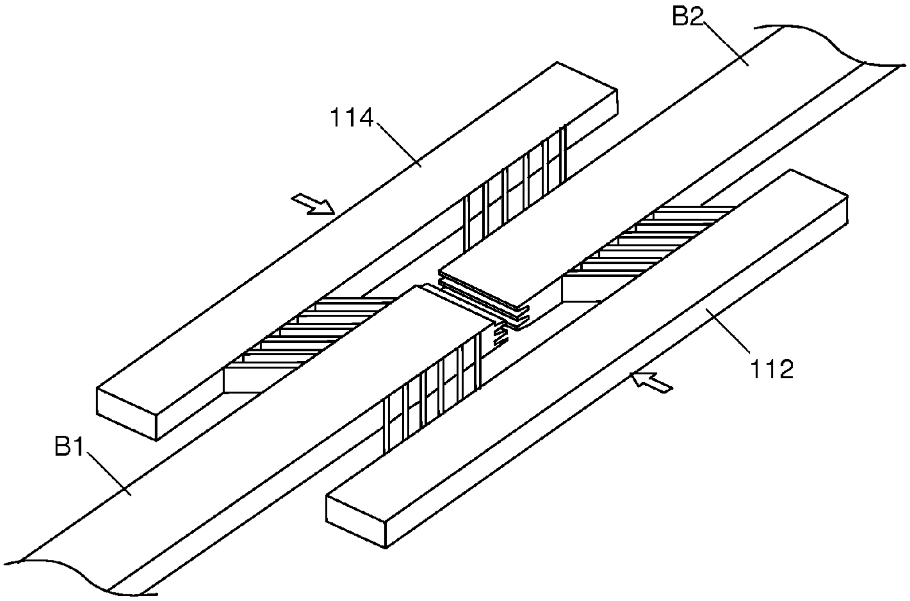
FIG. 1 is a perspective view of one embodiment of a clamping apparatus, in accordance with the principles of the present disclosure.

Example embodiments will now be described more fully with reference to the accompanying drawings. The description of embodiments has been provided for purposes of illustration, and is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

In the various embodiments, a clamping apparatus is provided for joining the ends of two boards of varying length having mating joints on adjoining ends of the boards. In one first exemplary embodiment shown in FIGS. 1-2, the apparatus 100 for joining two boards comprises a pair of clamp components 112 and 114, each having a center portion C, and a first set 116 of flexible fingers 120 and second set 118 of flexible fingers 120 disposed on opposing sides of the center portion C. While a pair of clamp components 112, 114 are shown, the pair need not be identical to each other. The first and second sets 116, 118 of flexible fingers 120 extend angularly in a direction towards the center portion C such that the first set 116 of flexible fingers 120 extend in a first direction generally opposite that of the second set 118 of flexible fingers 120 extending in a second direction. It should be noted that the center portion C generally refers to a region of the clamp components 112, 114 approximately midway between the first and second set 116, 118 of flexible fingers 120.

The first and second sets 116, 118 of flexible fingers 120 on the pair of clamp components 112, 114 are configured to deflect when forced against two unjoined boards B1, B2 disposed between the flexible fingers 120 of the pair of clamp components 112, 114, so as to cause two unjoined boards B1, B2 disposed between the pair of clamp components 112, 114 to move towards each other to join mating joints J on the ends of said boards B1, B2. Preferably, the first set 116 of flexible fingers 120 extend in a direction generally opposed to that of the second set 118 of flexible fingers 120, such that a transverse force F applied to the first and second sets 116, 118 causes the first and second sets 116, 118 of flexible fingers 120 to respectively deflect in opposite directions.

Unlike featherboards for a table saw having flexible fingers that are all angled in a direction of travel towards a saw blade, where the fingers resist movement of stock away from the saw blade to reduce the likelihood of kickback, the present clamp apparatus includes a first set of flexible fingers extending in a direction generally opposite from that of the second set of flexible fingers. The configuration of first and second sets of fingers arranged in opposing directions would not have been contemplated by a skilled artisan since such an arrangement would not have yielded predictable results in reducing kickback, because sets of fingers in opposing directions could not perform the expected function of a featherboard. Such opposing directions would render the angularly extending fingers of the present design unsatisfactory for use as a featherboard, because a stock board would be prohibited from moving along one set of finger by the other set of fingers that are oriented in the opposite direction. Moreover, the present design also yields synergistic results, by the configuration of first and second sets of flexible fingers arranged in opposing directions, when applied in combination on opposing sides of two stock boards to be joined, was found to produce the unexpected result of uniformly applying a substantial joining force for joining two boards while displacing the boards an appropriate length of about 0.125 inches corresponding to the dimensions of typical joint designs. Specifically, the first and second sets of flexible fingers arranged in opposing directions, when applied in combination on opposing sides of two stock boards to be joined, was found to provide flexible fingers configured to deflect at least 0.125 inches and to exert a joining force of at least 20 pounds at the joint between the boards, as explained below.

Figure 2:
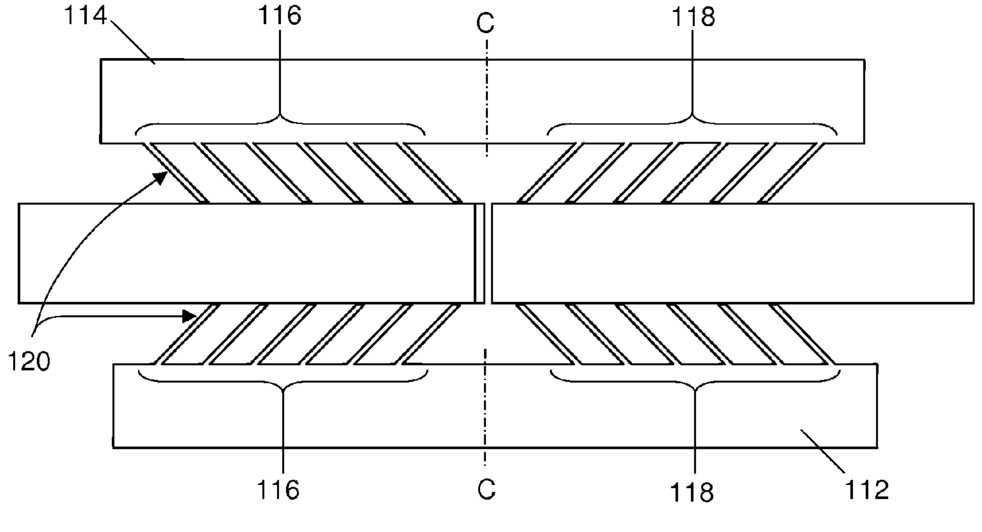
FIG. 2 is a top elevation view of the clamp components and two boards to be joined in the clamping apparatus shown in FIG. 1.

In each of the clamp components 112, 114 shown in FIGS. 1-2, the free ends of the first set 116 of angularly-extending flexible fingers 120 and the free ends of the second set 118 of angularly-extending flexible fingers 120 are angled towards the center portion C of the first elongate clamp component 112, 114. The free ends of the first and second sets 116, 118 of angularly-extending flexible fingers 120 are configured to be deflected to cause two boards B1, B2 disposed between the first and second clamp components 112, 114 to each be displaced towards the center portion C of the first and second clamp components 112, 114 when the first and second sets 116, 118 of flexible fingers 120 on the first and second clamp components 112, 114 are compressed against the two boards B1, B2. The force applied by the clamp components 112, 114 causes the angularly-extending flexible fingers 120 to displace the two boards B1, B2 towards each other, such that the mating joints J on the ends of the first and second boards B1, B2 are displaced towards and compressed against each other. In the first embodiment, the flexible fingers 120 in each of the first and second sets 116, 118 on each of the first and second clamp components 112, 114 are configured to deflect at least 0.125 inches to cause a first board B1 disposed between the first and second clamp components 112, 114 to be displaced at least 125 inches towards the center portions C of the first and second clamp components 112, 114, and a second board B2 disposed between the first and second clamp components 112, 114 to be displaced at least 0.125 inches towards the center portion C of the first and second clamp components 112, 114 when the first and second clamp components 112, 114 are compressed against the first and second boards B1, B2 disposed between the first and second clamp components 112, 114. This deflection causes mating joints J on the ends of the first and second boards B1, B2 to be displaced towards and compressed together, to thereby join the first and second boards B1, B2.

In the first embodiment shown in FIG. 1, the first and second sets 116, 118 of flexible fingers 120 comprise a plurality of angularly extending fingers 120 that are spaced apart from each other by at least a minimum distance of at least about 0.125 inches. The plurality of angularly extending flexible fingers 120 may be spaced apart from each other by a spacing of between about 0.125 inches to about 1.5 inches, and more preferably have a spacing of about 1.0 inches between the angularly extending flexible fingers. Each of the plurality of angularly extending flexible fingers 120 shown in FIGS. 1 and 2 have a thickness of at least 0.09 inches, and extend at an angle of between 30 degrees and 60 degrees, and more preferably extend at an angle of at least about 45 degrees relative to the longitudinal direction of the clamp components 112, 114. The first and second sets 116, 118 of flexible fingers 120 comprise a set of at least six flexible fingers 120 that extend a distance of about 1.40 inches from the side of the clamp components 112, 114. The opposing first and second sets 116, 118 of flexible fingers 120 are preferably spaced apart by a spacing of at least 1 inch, and more preferably by a spacing of about 1.142 inches between the free ends of the flexible fingers 120 in the first and second sets 116, 118 that are closest to each other. In the first embodiment, the flexible fingers 120 are made of pine, but may alternatively be made of softwoods or hardwoods such as aspen or oak, and preferably have a modulus of elasticity of between about $0.96 \times 10^6$ pounds force per square inch to about $2.28 \times 10^6$ pounds force per square inch. While a clamping apparatus made with less than six flexible fingers 120 can still be used to join two boards, it has been found that less than six flexible fingers can cause indentations in the boards being joined. It has also been found that a clamping apparatus 100 with a plurality of angularly extending flexible fingers 120 having the above modulus of elasticity, dimensions and spacing arrangement were configured to achieve a finger deflection of at least 0.125 inches without breaking as a result of the bending moment or shear stress exceeding the yield strength of the flexible fingers 120. In the first embodiment, the first and second sets 116, 118 of flexible fingers 120 of the first and second clamp components 112, 114 having the above modulus of elasticity, dimensions and spacing arrangement were configured to deflect, with a force with a force F applied to the clamp components 112, 114, to displace and join the two unjoined boards B1, B2 to produce of compression force of about 34 pounds applied at the joint J between the boards B1, B2. Accordingly, the flexible fingers 120 in the first and second sets 116, 118 on each of the first and second clamp components 112, 114 are configured such that in response to an applied force compressing the first and second clamp components 112, 114 against first and second boards B1, B2 disposed between the first and second clamp components 112, 114, the flexible fingers 120 are configured to deflect at least 0.125 inches and to exert a sufficient joining force at the joint J between the boards B1, B2.

Figure 3:
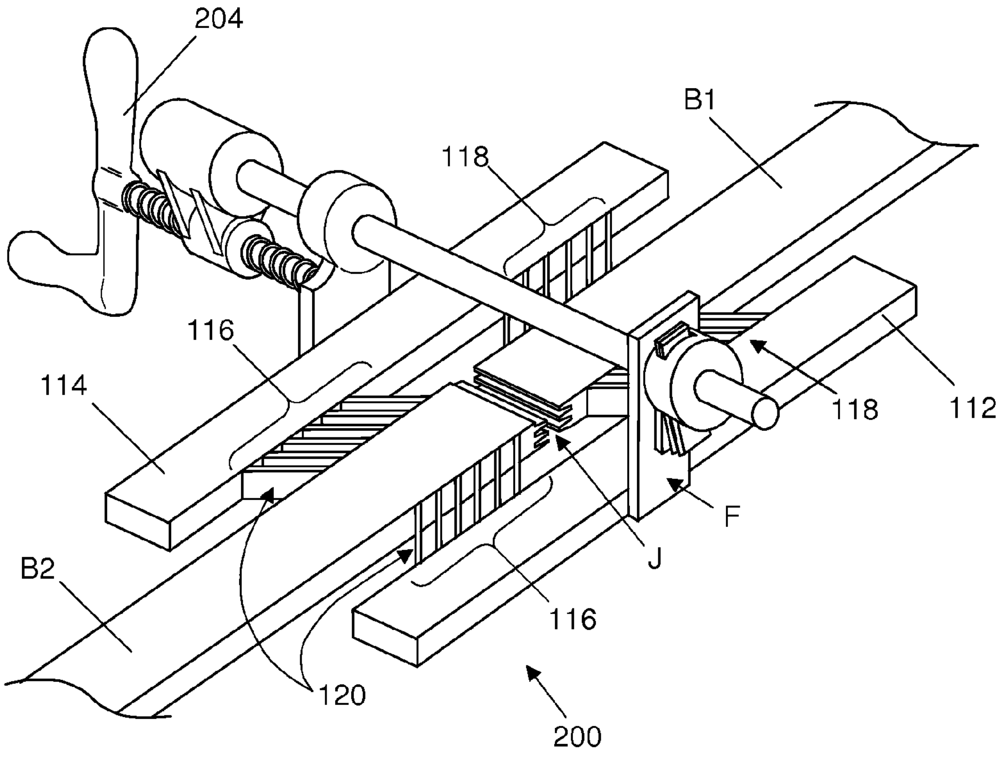
FIG. 3 is a second embodiment of a clamping apparatus in combination with a clamp device.

Referring to FIG. 3, a second embodiment of a clamping apparatus 200 is shown. The clamping apparatus 200 includes clamp device 204 in combination with first and second clamp components 112, 114 of the first embodiment. The clamp device 204 is configured to compress the first and second sets 116, 118 of flexible fingers 120 on the first and second clamp components 112, 114 against two boards disposed between the angularly-extending flexible fingers 120 on the first and second clamp components 112, 114. The first and second sets 116, 118 of flexible fingers 120 on each of the first and second clamp components 112, 114 are configured to deflect and cause two boards B1, B2 disposed between the first and second clamp components 112, 114 to each be displaced towards the center portion C of the first and second clamp components 112, 114 when the first and second sets 116, 118 of flexible fingers 120 on the first and second clamp components 112, 114 are compressed against the two boards B1, B2. The force F applied by the clamp 204 causes the angularly-extending flexible fingers 120 to displace the two boards B1, B2 towards each other, such that the mating joints J on the ends of the first and second boards B1, B2 are displaced towards and compressed against each other. It should be noted that any clamping apparatus such as the clamp device 204 in the second embodiment may be included in combination with any of the various embodiments of clamp components disclosed herein, and not only that of the first embodiment.

Figure 4:
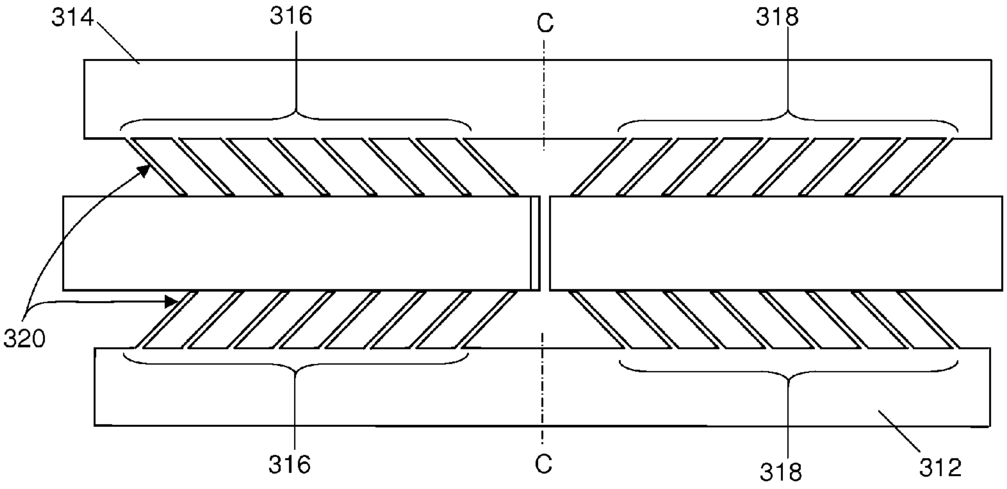
FIG. 4 is a third embodiment of a clamping apparatus, with an alternate arrangement of angularly extending flexible fingers in accordance with the principles of the present disclosure.

Referring to FIG. 4, a third embodiment is shown of a clamp apparatus 300 having an alternate arrangement of first and second sets 316, 318 of angularly extending flexible fingers 320. In the third embodiment, the first and second sets 316, 318 of angularly-extending flexible fingers 320 are configured to deflect at least 0.125 inches to cause a first board and second board B1, B2 disposed between the first and second clamp components 312, 314 to be displaced at least 0.125 inches towards the center portion C of the first and second clamp components 312, 314.

In the third embodiment, the first and second sets 316, 318 of flexible fingers 320 comprise a plurality of angularly extending fingers 320 that are spaced apart from each other by at least a minimum distance of at least about 0.5 inches. The plurality of angularly extending flexible fingers 320 may be spaced apart from each other by a spacing of between about 0.125 inches to about 1.5 inches, and more preferably have a spacing of about 1.0 inches between the angularly extending flexible fingers 320. Each of the plurality of angularly extending flexible fingers 320 shown in FIG. 4 have a thickness of at least 0.09 inches, and extend at an angle of between 30 degrees and 60 degrees, and more preferably at least 45 degrees relative to the elongate clamp components. The first and second sets 16, 318 of flexible fingers 320 comprise a set of at least eight flexible fingers 320 that extend a distance of about 1.40 inches from the side of the clamp component 312, 314. The opposing first and second sets 316, 318 of flexible fingers 320 are preferably spaced apart by a spacing of at least 1 inch, and more preferably by a spacing of about 1.142 inches between the free ends of the flexible fingers 320 in the first and second sets 316, 318 that are closest to each other. In the third embodiment, the flexible fingers 320 are made of pine, but may alternatively be made of softwoods or hardwoods such as aspen, poplar, hickory, maple or oak. The flexible fingers are preferably made of a wood having a modulus of elasticity of between about $0.96\times10^6$ pounds force per square inch to about $2.28\times10^6$ pounds force per square inch. It has been found that a clamping apparatus 300 with a plurality of angularly extending flexible fingers 320 having the above modulus of elasticity, dimensions and spacing arrangement were configured to achieve a finger deflection of at least 0.125 inches without breaking as a result of the bending moment or shear stress exceeding the yield strength of the flexible fingers 320. In the third embodiment, the first and second sets 316, 318 of flexible fingers 320 of the first and second clamp components 312, 314 having the above modulus of elasticity, dimensions and spacing arrangement were configured to deflect, with a force of 138.3 pounds applied to the clamp components 312, 314, to displace and join the two unjoined boards B1, B2 with a force of 37.3 pounds. It was found in testing a clamp apparatus 300 using only 4 flexible fingers 320 in the first and second opposing sets 316, 318 that the flexible fingers 329 were configured to deflect, with a force of 120.9 pounds applied to the clamp components 312, 314, to displace and join the two unjoined boards B1, B2 to produce of compression force of about 33.9 pounds applied at the joint J between the boards B1, B2. Accordingly, the flexible fingers 320 in the first and second sets 316, 318 on each of the first and second clamp components 312, 314 are configured such that in response to an applied force F compressing the first and second clamp components 312, 314 against first and second boards B1, B2 disposed between the first and second clamp components 312, 314, the flexible fingers 320 are configured to deflect at least 0.125 inches and to exert a joining force of at least 20 pounds at the joint J between the boards B1, B2.

Figure 5:
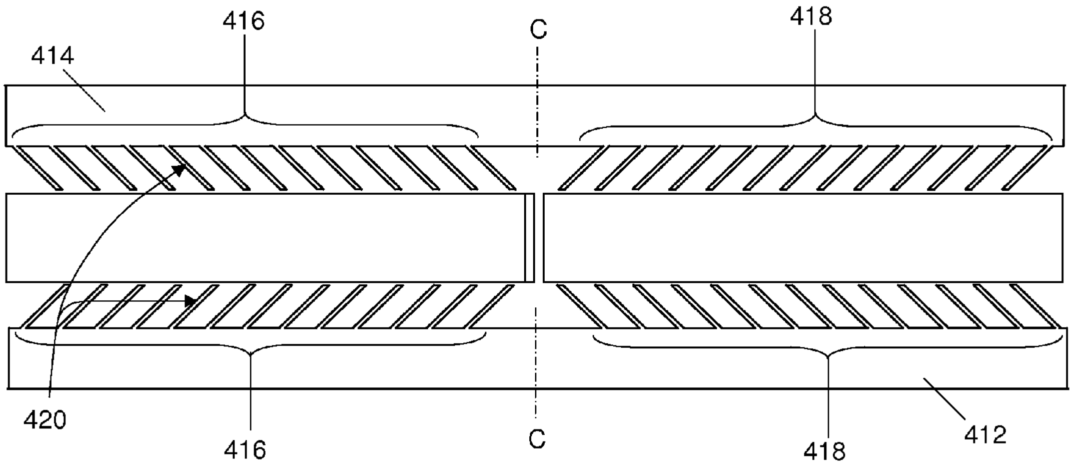
FIG. 5 is a fourth embodiment of a clamping apparatus, with an alternate arrangement of angularly extending flexible fingers in accordance with the principles of the present disclosure.

Referring to FIG. 5, a fourth embodiment is shown of a clamp apparatus 400 having an alternate arrangement of first and second sets 416, 418 of angularly extending flexible fingers 420. The first and second sets 416, 418 of angularly-extending flexible fingers 420 are configured to deflect at least 0.125 inches to cause a first board B1 and second board B2 disposed between the first and second clamp components 412, 414 to be displaced at least 0.125 inches towards the center portion C of the first and second clamp components 412, 414.

In the fourth embodiment shown in FIG. 5, the first and second sets 416, 418 of flexible fingers 420 comprise a plurality of angularly extending fingers 420 that are spaced apart from each other by at least a minimum distance of at least about 0.125 inches. The plurality of angularly extending flexible fingers 420 may be spaced apart from each other by a spacing of between about 0.125 inches to about 1.5 inches, and more preferably have a spacing of about 0.5 inches between the angularly extending flexible fingers 420. Each of the plurality of angularly extending flexible fingers 420 shown in FIG. 5 have a thickness of at least 0.09 inches, and extend at an angle of between 30 degrees and 60 degrees, and more preferably at least 45 degrees relative to the elongate clamp components 412, 414. The first and second sets 416, 418 of flexible fingers 420 comprise a set of at least thirteen flexible fingers 420 that extend a distance of about 1.40 inches from the side of the clamp component 412, 414. The opposing first and second sets 416, 418 of flexible fingers 420 are preferably spaced apart by a spacing of at least 1 inch, and more preferably by a spacing of about 1.142 inches between the free ends of the flexible fingers 420 in the first and second sets 416, 418 that are closest to each other. In the third embodiment, the flexible fingers 420 are made of a resilient plastic material such as a polyolefin, polyethylene, polypropylene, Delrin, Teflon, ABS plastic, with or without glass-fill, or any resilient material suitable for use in bending applications. The plastic material preferably has a modulus of elasticity of between about $0.11\times10^6$ pounds force per square inch to about $0.50\times10^6$ pounds force per square inch. It has also been found that a clamping apparatus 400 with a plurality of angularly extending flexible fingers 420 having the above modulus of elasticity, dimensions and spacing arrangement were configured to achieve a finger deflection of at least 0.125 inches to join two boards, without breaking as a result of the bending moment or shear stress exceeding the yield strength of the flexible fingers 420. In the fourth embodiment, the first and second sets 416, 418 of flexible fingers 420 of the first and second clamp components 412, 414 having the above modulus of elasticity, dimensions and spacing arrangement were configured to deflect, with a force of 57.4 pounds applied to the clamp components 412, 414, to displace and join the two unjoined boards B1, B2 to produce of compression force of about 20 pounds applied at the joint J between the boards B1, B2. Accordingly, the flexible fingers 420 in the first and second sets 416, 418 on each of the first and second clamp components 412, 414 are configured such that in response to an applied force compressing the first and second clamp components 412, 414 against first and second boards B1, B2 disposed between the first and second clamp components 412, 414, the flexible fingers 420 are configured to deflect at least 0.125 inches and to exert a joining force of at least 20 pounds at the joint J between the boards B1, B2.

Figure 6:
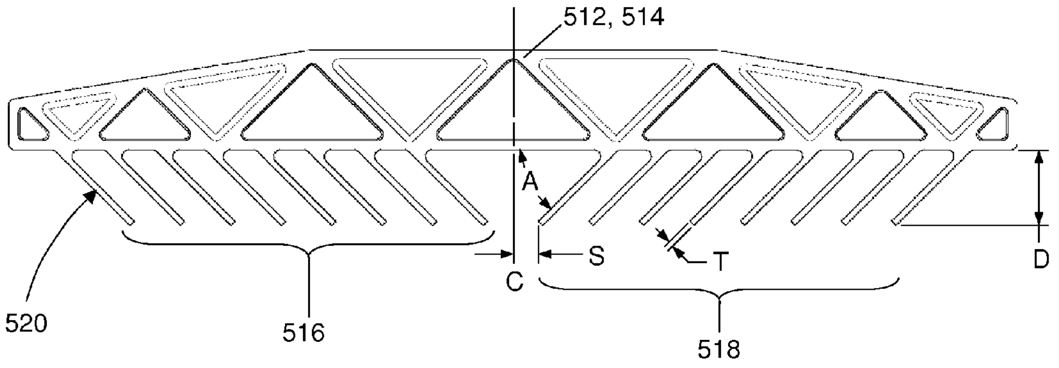
FIG. 6 is a fifth embodiment of a clamping apparatus, with an alternate arrangement of angularly extending flexible fingers in accordance with the principles of the present disclosure.
Figure 7:
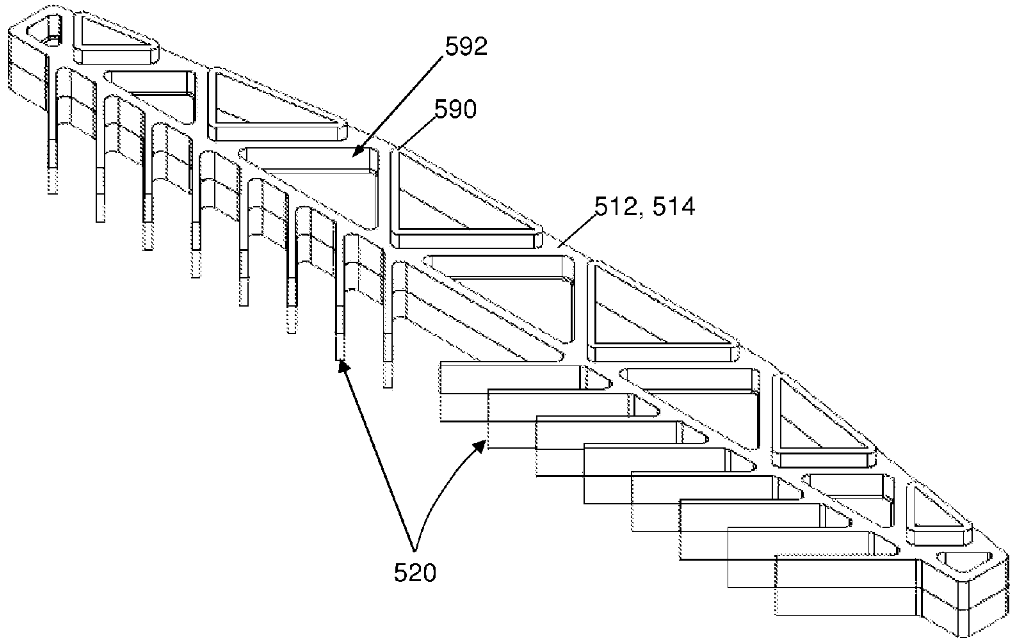
FIG. 7 is a perspective view of the clamping apparatus in FIG. 6.

Referring to FIG. 6, a fifth embodiment is shown of a clamp apparatus 500 having an alternate arrangement of first and second sets 516, 518 of angularly extending flexible fingers 520. In the fifth embodiment, the elongate clamp components 512, 514 have a ribbed configuration to reduce material and weight while maintaining structural strength. In the fifth embodiment, the first and second sets 516, 518 of angularly-extending flexible fingers 520 are configured to deflect at least 0.125 inches to cause a first board B1 and second board B2 disposed between the first and second clamp components 512, 514 to be displaced at least 125 inches towards the center portion C of the first and second clamp components 512, 514. In the fifth embodiment shown in FIG. 6, the first and second sets 516, 518 of flexible fingers 520 comprise a plurality of angularly extending fingers 520 that are spaced apart from each other by at least a minimum distance of at least about 0.125 inches. The plurality of angularly extending flexible fingers 520 may be spaced apart from each other by a spacing of between about 0.125 inches to about 1.5 inches, and more preferably have a spacing of about 0.70 inches between the angularly extending flexible fingers 520. Each of the plurality of angularly extending flexible fingers 520 shown in FIG. 6 have a thickness T of at least 0.125 inches, and extend at an angle A of between 30 degrees and 60 degrees, and more preferably at least 45 degrees relative to the elongate clamp components. The first and second sets of flexible fingers 520 comprise a set of at least eight flexible fingers that extend a distance D of about 1.50 inches from the side of the clamp component. The opposing first and second sets of flexible fingers are preferably spaced apart by a spacing S of at least 0.875 inches, and more preferably by a spacing of about 1.00 inch between the free ends of the flexible fingers 520 in the first and second sets 516, 518 that are closest to each other. In the fifth embodiment, the flexible fingers 520 are made of a resilient plastic material such as a polyolefin, polyethylene, polypropylene, Delrin, Teflon, ABS plastic, with or without glass-fill, or any resilient material suitable for use in bending applications. The plastic material preferably has a modulus of elasticity of between about $0.11\times10^6$ pounds force per square inch to about $0.50\times10^6$ pounds force per square inch. It has been found that a clamping apparatus 500 with a plurality of angularly extending flexible fingers 520 having the above modulus of elasticity, dimensions and spacing arrangement were configured to achieve a finger deflection of at least 0.125 inches without breaking as a result of the bending moment or shear stress exceeding the yield strength of the flexible fingers. In the fifth embodiment, the first and second sets 516, 518 of flexible fingers 520 of the first and second clamp components 512, 514 having the above modulus of elasticity, dimensions and spacing arrangement were configured to deflect, with a force F applied to the clamp components 512, 514, to displace the two unjoined boards B1, B2 to produce a sufficient compression force to join the boards B1, B2. Accordingly, the flexible fingers 520 in the first and second sets 516, 518 on each of the first and second clamp components 512, 514 are configured such that in response to an applied force compressing the first and second clamp components 512, 514 against first and second boards B1, B2 disposed between the first and second clamp components 512, 514, the flexible fingers 520 are configured to deflect at least 0.125 inches and to exert a sufficient joining force at the joint J to join the boards B1, B2. In addition to the above features, the clamp components of the above embodiments may further include a recess 590 and a corresponding protrusion 592 on opposing surfaces of the clamp components 512, 514, wherein the protrusion 592 on one clamp component 512 is configured to fit snugly within the recess 590 in the other clamp component 514, to thereby secure the pair of clamp components 512, 514 to each other. The recess 590 and protrusion 592 enable two or more clamp components 512, 514 to be stacked to provide multiple sets of fingers for exerting additional force for joining thicker boards.

In accordance with another aspect of the present disclosure, a method is provided for joining mating ends of two unjoined boards. The method uses first and second clamp components having first and second sets of angularly extending flexible fingers arranged in opposing directions, to joining the ends of two boards of variable length having mating joints on their adjoining ends. The method comprises positioning two boards of varying length having mating joints on their adjoining ends so that the mating joints on adjoining ends are facing each other. The method further comprises positioning on a first side of the two boards a first clamp component having a center portion and first and second sets of flexible fingers extending in opposing directions, and positioning on a second side of the two boards a second clamp component having a center portion and first and second sets of flexible fingers extending in opposing directions. The method further comprises applying a clamping force across the first and second clamp components to compress the first and second sets of flexible fingers on the first and second clamp components against the two boards to thereby deflect the flexible fingers, which causes a first board disposed between the first and second clamp components to be displaced at least 0.125 inches towards the center portions of the clamp components, and causes a second board disposed between the first and second clamp components to be displaced at least 0.125 inches towards the center portions of the clamp components. The deflection of the flexible fingers results in the mating joints on the ends of the first and second boards being displaced towards and compressed against each other.

The example embodiments above are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known joining processes and well-known device structures are not described in detail.

The terminology used herein is for the purpose of describing particular example embodiments only and is not intended to be limiting. As used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, but do not preclude the presence or addition of one or more other features. The method steps, processes, and operations described herein are not to be construed as necessarily requiring their performance in the particular order discussed or illustrated, unless specifically identified as an order of performance. It is also to be understood that additional or alternative steps may be employed. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items. Although the terms first, second, third, etc. may be used herein to describe various elements, components, regions, layers and/or sections, these elements, components, regions, layers and/or sections should not be limited by these terms. These terms may be only used to distinguish one element, component, region, or section from another region or section. Terms such as “first,” “second,” and other numerical terms when used herein do not imply a sequence or order unless clearly indicated by the context.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in any embodiment, even if not specifically shown or described. The same may also be varied in many ways. Such variations are not to be regarded as a departure from the invention, and all such modifications are intended to be included within the scope of the invention.

From the above, it may be appreciated that the present invention provides an improvement to the control of the joining of board lengths having a finger joint or other similar joining arrangement. The present invention is illustrated herein by example, and various modifications may be made by a person of ordinary skill in the art. It is believed that the operation and construction of the present invention will be apparent from the foregoing description. While the apparatus and methods shown or described above have been characterized as being preferred, various changes and modifications may be made therein without departing from the spirit and scope of the invention in the following claims.

What is claimed is:

1. A clamping apparatus for joining the ends of two boards having mating joints on adjoining ends, comprising:

a pair of clamp components, each clamp component having a first set of flexible fingers and a second set of flexible fingers on opposing ends of the clamp component, said flexible fingers extending angularly from the clamp component, with the first set of flexible fingers extending in a first direction generally opposed to that of the second set of flexible fingers extending in a second direction, the first and second sets of flexible fingers on each of the clamp components being configured to deflect when forced against two boards disposed between the pair of clamp components so as to cause the two boards to move towards each other, whereby mating ends of said boards are joined and, a clamp device comprising first and second jaws, a bar, a handle and an actuator configured to compress the pair of clamp components against two boards disposed between the first and second sets of flexible fingers on the pair of clamp components.

2. The clamping apparatus of claim 1 wherein the first and second sets of flexible fingers on the pair of clamp components are configured to deflect at least 0.125 inches to cause each of the two board disposed between the pair of clamp components to be displaced at least 0.125 inches towards a center portion of the clamp components when the pair of clamp components are forced against the two boards disposed between the clamp components, such that mating ends of the two boards are displaced towards and forced together to join the two boards.

3. The clamping apparatus of claim 2 wherein the flexible fingers in the first and second sets on each of the clamp components are configured such that in response to a force applied to the pair of clamp components against the two boards disposed between the pair of clamp components, the flexible fingers are configured to deflect at least 0.125 inches and to exert a force of at least 20 pounds to two boards for compressing a mating joint of the two boards.

4. The clamping apparatus of claim 3 wherein each of the flexible fingers has a thickness of at least 0.09 inches.

5. The clamping apparatus of claim 4 wherein the first and second sets of flexible fingers are spaced apart from each other by a spacing of between about 0.125 inches to about 1.5 inches.

6. The clamping apparatus of claim 5 wherein each of the flexible fingers extend at an angle of at least 45 degrees relative to the longitudinal direction of the clamp component.

7. The clamping apparatus of claim 1 wherein the first set of flexible fingers extend in a direction generally opposed to that of the second set of flexible fingers, such that a transverse force applied to the first and second sets causes the first set of flexible fingers and second set of flexible fingers to respectively deflect in opposite directions.

8. The clamping apparatus of claim 1 further comprising a recess and a corresponding protrusion on opposing surfaces of the clamp component, wherein the protrusion on said clamp component is configured to fit snugly within the recess in the other of said pair of clamp components to thereby secure the pair of clamp components to each other.

9. A clamping apparatus for joining the ends of two boards of variable length having mating joints on adjoining ends, the clamping apparatus comprising:

a first clamp component having a center portion, and a first set of flexible fingers and second set of flexible fingers disposed on opposing sides of the center portion, the first and second sets of flexible fingers extending angularly from the clamp component towards the center portion such that the first set of flexible fingers extend in a direction generally opposed to that of the second set, wherein said first and second set of flexible fingers and said center portion are attached to an elongate clamp component having a ribbed configuration, comprising a plurality of recesses and corresponding protrusions forming said ribbed configuration;

a second clamp component having a center portion, and a first set of flexible fingers and second set of flexible fingers disposed on opposing sides of the center portion, the first and second sets of flexible fingers extending angularly from the clamp component towards the center portion such that the first set of flexible fingers extend in a direction generally opposed to that of the second set, wherein said first and second set of flexible fingers and said center portion are attached to an elongate clamp component having a ribbed configuration, comprising a plurality of recesses and corresponding protrusions forming said ribbed configuration, wherein the first and second sets of flexible fingers on the first and second clamp components are configured to deflect when forced against two boards disposed between the flexible fingers of the first and second clamp components, so as to cause the two boards disposed between the first and second clamp components to move towards each other to join mating joints on the ends of said boards.

10. The clamping apparatus of claim 9 wherein the first and second sets of flexible fingers on each of the first and second clamp components are configured to deflect at least 0.125 inches to cause a first board disposed between the first and second clamp components to be displaced at least 0.125 inches towards the center portions of the first and second clamp components, and a second board disposed between the first and second clamp components to be displaced at least 0.125 inches towards the center portion of the first and second clamp components when the first and second clamp components are compressed against the first and second boards disposed between the first and second clamp components, such that the mating joints on the ends of the first and second boards are displaced towards and compressed together to thereby join the first and second boards.

11. The clamping apparatus of claim 10 wherein the flexible fingers in the first and second sets on each of the first and second clamp components are configured such that in response to a force applied to the first and second clamp components against first and second boards disposed between the first and second clamp components, the flexible fingers are configured to deflect at least 0.125 inches and to exert a joining force of at least 20 pounds for compressing a mating joint of two the boards.

12. The clamping apparatus of claim 11 wherein each of the angularly extending flexible fingers has a thickness of at least 0.09 inches.

13. The clamping apparatus of claim 12 wherein the first and second sets of angularly extending flexible fingers are spaced apart from each other by a spacing of between about 0.125 inches to about 1.5 inches.

14. The clamping apparatus of claim 13 wherein each of the angularly extending flexible fingers extend at an angle of at least 45 degrees relative to the longitudinal direction of the clamp component.

15. The clamping apparatus of claim 14 wherein each of the first and second sets of angularly extending flexible fingers comprise at least six angularly extending flexible fingers.

16. The clamping apparatus of claim 15 further comprising a clamp device configured to compress the pair of clamp components against two boards disposed between the first and second sets of flexible fingers on the pair of clamp components.

17. The clamping apparatus of claim 16 further comprising a third clamp component having a center portion, and a first set of flexible fingers and second set of flexible fingers disposed on opposing sides of the center portion, the first and second sets of flexible fingers extending angularly from the clamp component towards the center portion such that the first set of flexible fingers extend in a direction generally opposed to that of the second set, wherein said first and second set of flexible fingers and said center portion are attached to an elongates clamp component comprising a plurality of recesses forming a ribbed configuration with corresponding protrusion extending from said ribbed configuration;

a fourth clamp component having a center portion, and a first set of flexible fingers and second set of flexible fingers disposed on opposing sides of the center portion, the first and second sets of flexible fingers extending angularly from the clamp component towards the center portion such that the first set of flexible fingers extend in a direction generally opposed to that of the second set, wherein said first and second set of flexible fingers and said center portion are attached to an elongates clamp component comprising a plurality of recesses forming a ribbed configuration with corresponding protrusion extending from said ribbed configuration, the third and fourth clamp components are attached to the first and second components respectively by the corresponding protrusions of found on each of said first, second, third and fourth clamp components, wherein the protrusion on one clamp component is configured to fit snugly within the recess in the other of said first to third clamp components and second to fourth clamp components to thereby secure the clamp components to each other.

18. A method for using first and second clamp components having first and second sets of angularly extending flexible fingers arranged in opposing directions, to joining the ends of two boards of variable length having mating joints on their adjoining ends, the method comprising:

positioning two boards of varying length having mating joints on their adjoining ends so that the mating joints on adjoining ends are facing each other;

positioning on a first side of the two boards a first clamp component having a center portion and first and second sets of flexible fingers extending in opposing directions;

positioning on a second side of the two boards a second clamp component having a center portion and first and second sets of flexible fingers extending in opposing directions;

applying a clamping force across the first and second clamp components to compress the first and second sets of flexible fingers on the first and second clamp components against the two boards to thereby deflect the flexible fingers, which causes a first board disposed between the first and second clamp components to be displaced at least 0.125 inches towards the center portions of the clamp components, and causes a second board disposed between the first and second clamp components to be displaced at least 0.125 inches towards the center portions of the clamp components, whereby the deflection of the flexible fingers results in the mating joints on the ends of the first and second boards being displaced towards and compressed against each other and, a clamp device comprising first and second jaws, a bar, a handle and an actuator configured to compress the first and second clamp components against two boards disposed between the first and second sets of flexible fingers on the pair of clamp components.

19. The method of claim 18 wherein the compression of the first and second clamp components against the two boards causes the flexible fingers in each of the first and second sets on each of the first and second clamp components to deflect at least 0.125 inches, to cause the two boards disposed between the first and second clamp components to each be displaced at least 0.125 inches towards the center portion of the first and second elongate members, such that the mating joints on the ends of the first and second boards are displaced towards and compressed against each other.

* * * * *